(12) United States Patent
Avenhaus et al.

(10) Patent No.: US 11,670,916 B2
(45) Date of Patent: Jun. 6, 2023

(54) SUPPORT RAIL AND HOUSING ASSEMBLY

(71) Applicant: Weidmüller Interface GmbH & Co. KG, Detmold (DE)

(72) Inventors: Eike Avenhaus, Bad Oeynhausen (DE); Peter Giesbrecht, Detmold (DE); Jörg Diekmann, Oerlinghausen (DE); Peter Meyer, Bad Salzuflen (DE); Genadij Neumann, Detmold (DE); Andre Remke, Saerbeck (DE)

(73) Assignee: Weidmüller Interface GmbH & Co. KG

( * ) Notice: Subject to any disclaimer, the term of this patent is extended or adjusted under 35 U.S.C. 154(b) by 319 days.

(21) Appl. No.: 16/755,923

(22) PCT Filed: Oct. 18, 2018

(86) PCT No.: PCT/EP2018/078534
§ 371 (c)(1),
(2) Date: Jun. 19, 2020

(87) PCT Pub. No.: WO2019/086260
PCT Pub. Date: May 9, 2019

(65) Prior Publication Data
US 2020/0343698 A1    Oct. 29, 2020

(30) Foreign Application Priority Data

Nov. 3, 2017  (DE) .................... 20 2017 106 653.3

(51) Int. Cl.
*H02B 1/04* (2006.01)
*F16B 21/08* (2006.01)
(Continued)

(52) U.S. Cl.
CPC ............. *H02B 1/042* (2013.01); *F16B 21/08* (2013.01); *F16B 21/09* (2013.01); *H01R 4/305* (2013.01); *H01R 4/64* (2013.01); *H02B 1/052* (2013.01)

(58) Field of Classification Search
CPC ......... H02B 1/32; H02B 1/048; F16B 13/061; F16B 5/0642; F16B 5/0664
See application file for complete search history.

(56) References Cited

U.S. PATENT DOCUMENTS 3,702,137 A   11/1972  Evans
6,378,825 B1   4/2002  Yee
(Continued)

FOREIGN PATENT DOCUMENTS

DE       19859716 A1    6/2000
DE    102012102170 A1    9/2013
(Continued)

*Primary Examiner* — Jean F Duverne
(74) *Attorney, Agent, or Firm* — Laubscher & Laubscher, PC

(57) ABSTRACT

A support rail and housing assembly is mountable on a housing base. The housings are equipped with electrical contact and/or functional elements which can be strung together. The support rail is mountable on the mounting base even when the housings have already been arranged on the support rail before the support rail is mounted. The support rail is secured to the mounting base by two or more mounting pins which have been placed before the support rail is mounted to the mounting base. The mounting pins and the support rail are designed to correspond to each other such that the support rail can be placed on the mounting pins and locked thereto without using a tool.

29 Claims, 25 Drawing Sheets

(51) Int. Cl.
*F16B 21/09* (2006.01)
*H01R 4/30* (2006.01)
*H01R 4/64* (2006.01)
*H02B 1/052* (2006.01)

(56) References Cited

U.S. PATENT DOCUMENTS

| | | | | |
|---|---|---|---|---|
| 7,306,191 | B1 * | 12/2007 | Chen | F04D 25/088 |
| | | | | 248/225.11 |
| 7,530,329 | B1 * | 5/2009 | Paris, Sr. | A01K 5/0114 |
| | | | | 211/94.01 |
| 8,763,966 | B2 * | 7/2014 | Stupnik | F25D 23/006 |
| | | | | 248/221.11 |
| 9,127,807 | B1 * | 9/2015 | Holloway | F16M 11/043 |
| 2002/0192047 | A1 | 12/2002 | Wille | |
| 2015/0076298 | A1 | 3/2015 | Peter | |
| 2017/0197668 | A1 | 7/2017 | Miyamoto | |

FOREIGN PATENT DOCUMENTS

| | | |
|---|---|---|
| EP | 0017124 A1 | 10/1980 |
| EP | 1376793 A1 | 1/2004 |
| FR | 2719184 A1 | 10/1995 |
| GB | 2219622 A | 12/1989 |
| GB | 2234546 A | 2/1991 |

\* cited by examiner

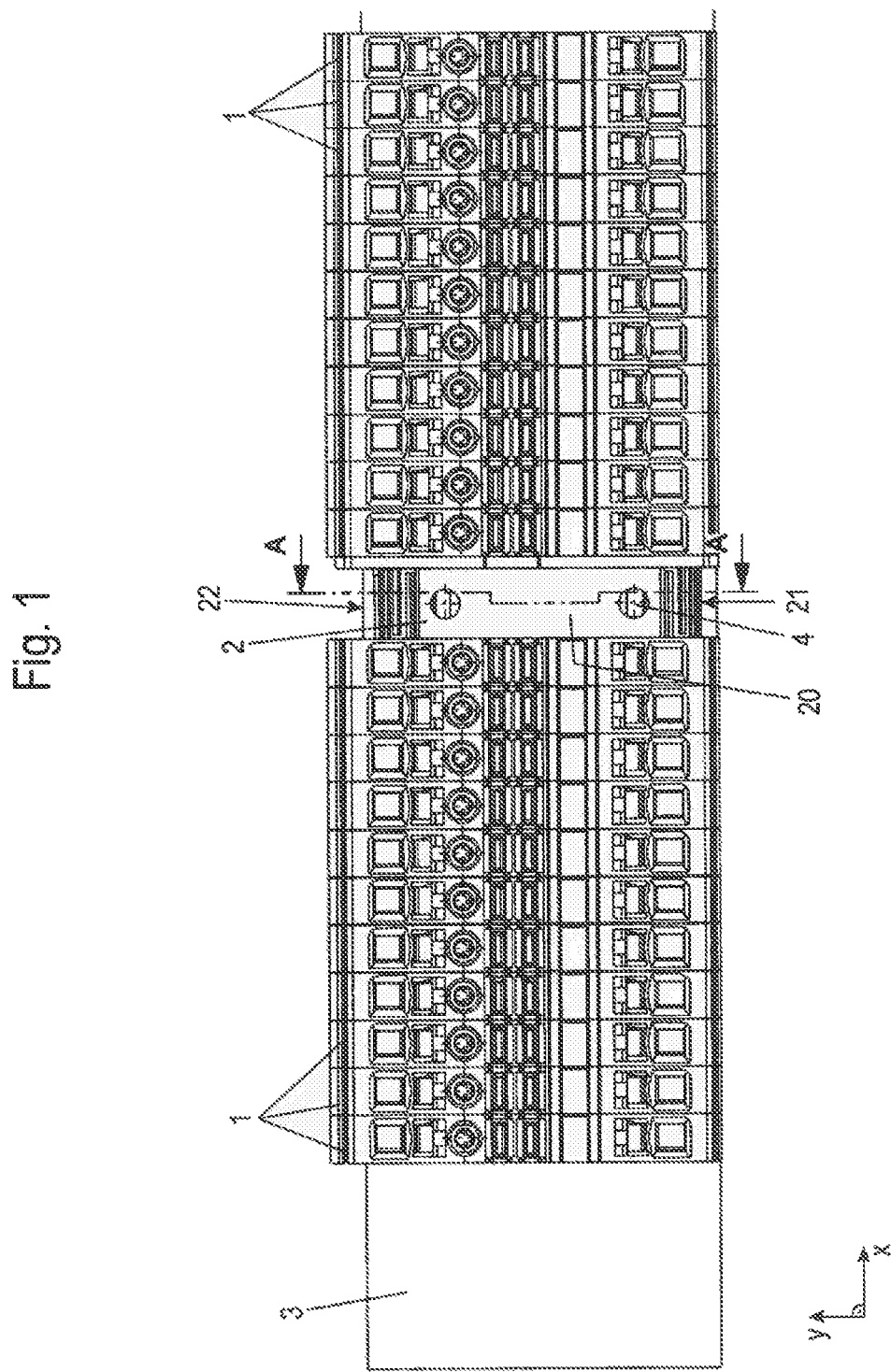

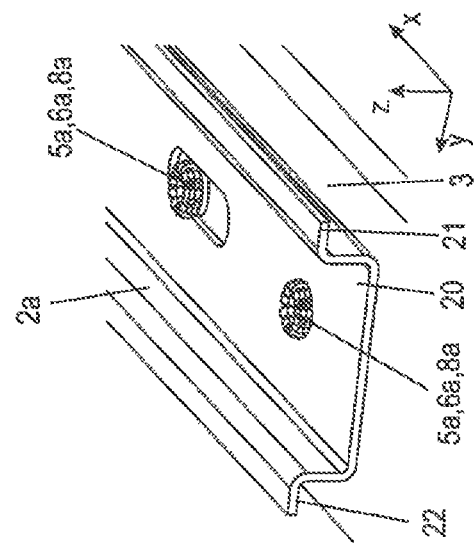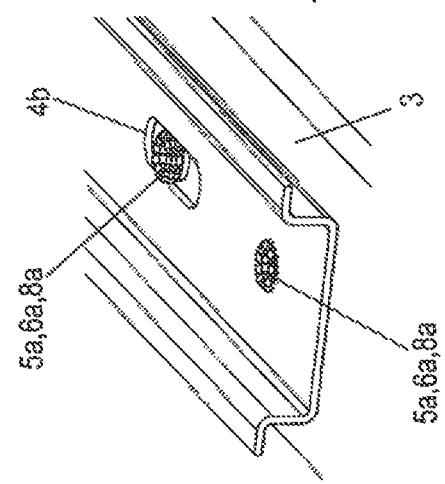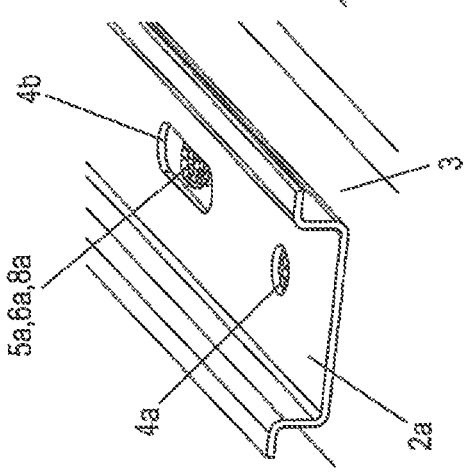

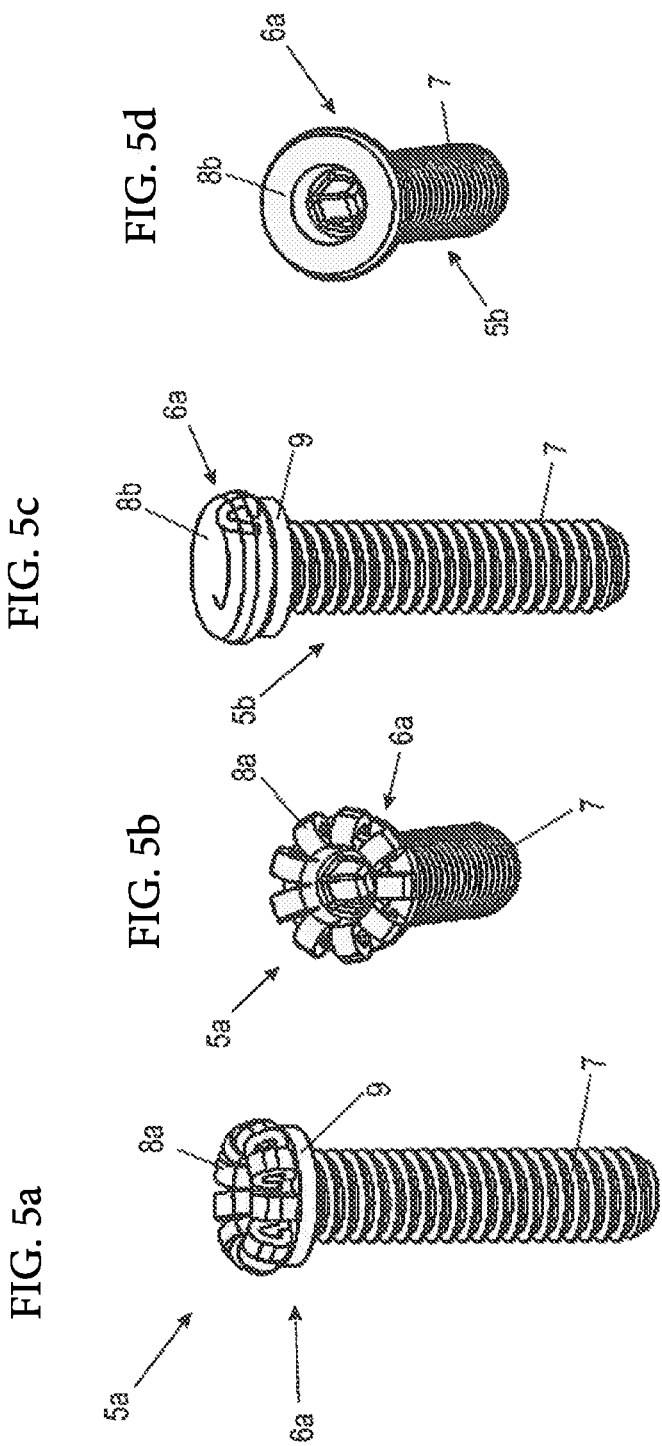

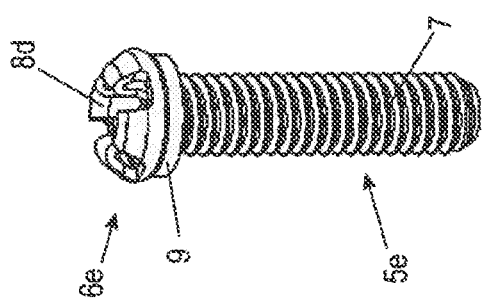

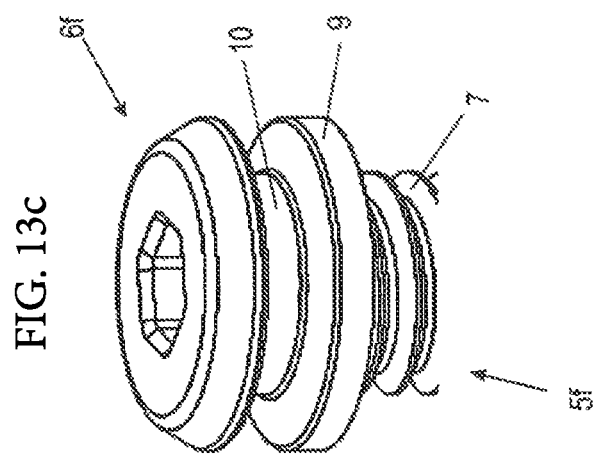
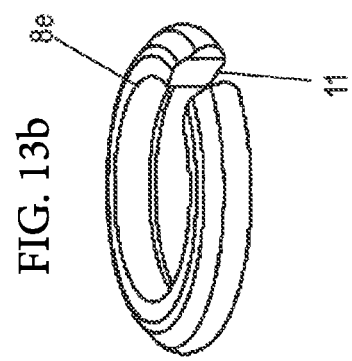
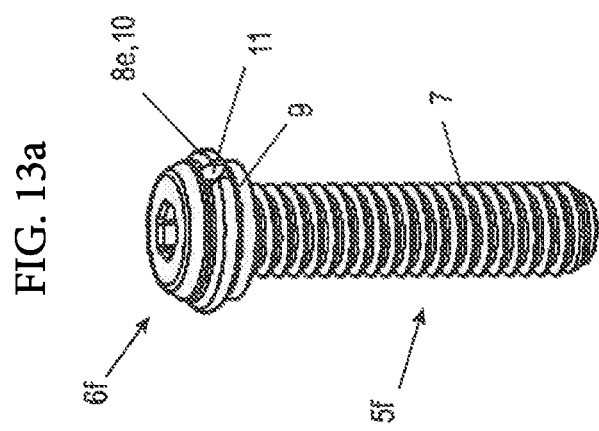

SUPPORT RAIL AND HOUSING ASSEMBLY

This application is a § 371 National Stage Entry of PCT/EP2018/078534 filed Oct. 18, 2018. PCT/EP2018/078534 claims priority of DE 202017106653.3 filed Nov. 3, 2017. The entire contents of these applications are incorporated herein by reference.

BACKGROUND OF THE INVENTION

The invention relates to an assembly including a support rail on which a plurality of housings that can be strung together and that can be equipped or are already equipped with electrical contact and/or functional elements can be arranged. The support rail is mountable on a mounting base even when the housings have already been arranged on the support rail before the support rail is mounted, and the support rail is attached to the mounting base by one, two or more mounting pins which have been put in place on the mounting base before the support rail is mounted.

In switch cabinet construction, it is necessary to string housings of electrical contact elements and functional elements (i.e. housings that can be equipped or are already equipped with electrical contact and/or functional elements) together on support rails in a previously defined quantity and sequence and to fix them—for example in a locking manner—on the support rail. The support rail can have a cross-sectional geometry in the form of a hat, by way of example, but it can also have a different, for example C-shaped, cross-section. The stringing-together or fitting and the subsequent fixing of each individual housing of the contact elements and functional elements is customarily carried out on a support rail which is already inserted into the switch cabinet and fixed on a mounting base, for example. This type of mounting is relatively labour-intensive and painstaking.

SUMMARY OF THE INVENTION

According to the disclosure, the mounting pins and the support rail are configured such that the support rail can be placed onto the mounting pins and locked in place thereon without using a tool.

In this manner, a majority of the modular housings can be placed onto the support rail over a part of its length or even over its entire length before it is mounted. The support rail fitted with the modular housings is placed onto the mounting pins as a preassembled unit and is locked in place thereon.

Alternatively, the support rail is retained on the mounting base by at least two mounting pins pre-mounted on the support rail, wherein the mounting pins are locked in the mounting base by a locking device.

BRIEF DESCRIPTION OF THE FIGURES

The invention is described in greater detail hereafter with reference to the drawings, wherein different embodiments are also discussed. It should be emphasised that the embodiments discussed hereafter are not meant to be exclusive, but on the contrary, variants and equivalents which are also not depicted are able to be accomplished and fall within the claims. In the drawings:

FIG. 1 is a plan view of strung-together electrical contact elements and functional elements on a support rail, which is mounted on a mounting base of a switch cabinet;

FIG. 2a is a perspective view of an exemplary embodiment of the support rail, the support rail being depicted prior to toolless mounting;

FIG. 2b is a perspective view of the exemplary embodiment of the support rail from FIG. 2a, the support rail being depicted during the toolless mounting;

FIG. 2c is a perspective view of the exemplary embodiment of the support rail from FIG. 2a, the support rail being depicted after toolless mounting has occurred;

FIG. 3a is a sectional front view of the support rail from FIG. 2a;

FIG. 4b is an enlarged sectional front view of a design variant of the support rail from FIG. 4a;

FIG. 5a is a perspective view of a mounting pin;

FIG. 5b is a further perspective view of the mounting pin from FIG. 5a;

FIG. 5c is a perspective view of a design variant of the mounting pin from FIG. 5a;

FIG. 5d is a further perspective view of the mounting pin from FIG. 5c;

FIG. 6b is an enlarged sectional front view of a different embodiment of the support rail from FIG. 6a;

FIG. 7b is a further perspective detail view of the mounting pin from FIG. 7a;

FIG. 8b is an enlarged sectional front view of a different embodiment of the support rail from FIG. 8a;

FIG. 9b is a further perspective view of the mounting pin from FIG. 9a;

FIG. 10b is an enlarged sectional front view of a further embodiment of the support rail from FIG. 10a;

FIG. 11a is a perspective view of a mounting pin from FIG. 10a or FIG. 10b;

FIG. 11b is a further perspective view of the mounting pin from FIG. 11a;

FIG. 11c is a perspective detail view of a head of the mounting pin from FIG. 10a or FIG. 10b;

FIG. 11d is a further perspective detail view of the head of the mounting pin from FIG. 11a or FIG. 11b;

FIG. 12b is an enlarged sectional front view of a further embodiment of the support rail from FIG. 12a;

FIG. 13a is a perspective view of a mounting pin from FIG. 12a or FIG. 12b;

FIG. 13b is a perspective detail view of a locking device of the mounting pin from FIG. 13a;

FIG. 13c is a perspective detail view of the mounting pin from FIG. 13a without the locking device from FIG. 13b;

FIG. 14b is an enlarged sectional front view of a further embodiment of the support rail from FIG. 14a;

FIG. 15b is a perspective detail view of a locking device of the mounting pin from FIG. 15a;

FIG. 17b is a sectional front view of the support rail from FIG. 17a;

FIG. 18b is a sectional front view of the support rail from FIG. 18a;

FIG. 19b is a perspective view of the mounting pin from FIG. 19a;

FIG. 19c is a perspective view of a detail of the mounting pin from FIG. 19a;

FIG. 20a is a perspective view of strung-together electrical contact elements and functional elements on a support rail prior to mounting with the mounting pin from FIG. 19a;

FIG. 20b is a plan view of strung-together electrical contact elements and functional elements on the support rail from FIG. 20a prior to mounting with the mounting pin from FIG. 19a;

FIG. 20c is a sectional side view of strung-together electrical contact elements and functional elements on the support rail from FIG. 20a prior to mounting with the mounting pin from FIG. 19a;

FIG. 21a is a perspective view of strung-together electrical contact elements and functional elements on the support rail from FIG. 20a during mounting with the mounting pin from FIG. 19a;

FIG. 21b is a plan view of strung-together electrical contact elements and functional elements on the support rail from FIG. 20a during mounting with the mounting pin from FIG. 19a;

FIG. 21c is a sectional side view of strung-together electrical contact elements and functional elements on the support rail from FIG. 20a during mounting with the mounting pin from FIG. 19a;

DETAILED DESCRIPTION

Figure 3A:
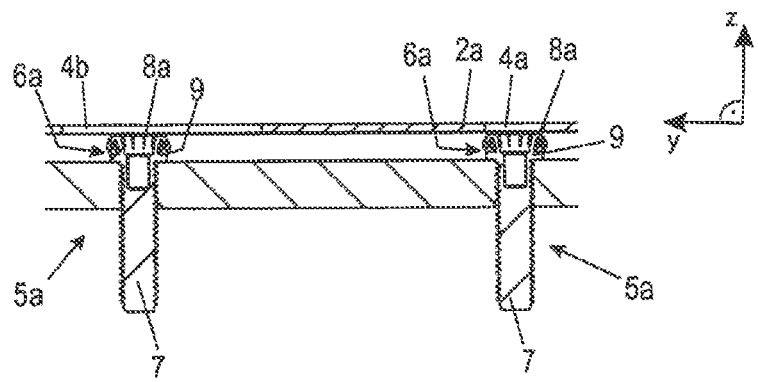

According to FIG. 1, a plurality of strung-together housings including electrical contact elements and functional elements 1 is fixed on a support rail 2, which is mounted on a mounting base 3 of a switch cabinet (not shown). Within the context of this disclosure, the term "housing comprising electrical contact elements and functional elements" is to be understood as terminal strips, the housings of which are fitted with one or more passive and/or active components, including conductors and power rails, but also as electronic housings which are able to be fitted with components. The support rail 2 can, as depicted here, have a hat-like cross-sectional geometry, by way of example, but it can also have a different, for example C-shaped, cross-section.

In a first mounting step 100, the housings 1 comprising contact elements and functional elements (which are to be accommodated on the support rail in accordance with a wiring/circuit diagram) are mounted strung together in a defined number and sequence on the support rail 2. For this purpose, locking feet, for example, of the housings 1 are locked onto the support rail.

Generally, edges 21, 22 of support rail 2—which are L-shaped in this embodiment—are of use for preassembly of the housings 1 and the support rail into a preassembled unit. A base leg 20 extends between these edges. The main direction of projection of the support rail and of this base leg 20 is designated by X in the drawing. The locking-on of the housings 1 takes place substantially perpendicular to the support rail 2 and to the mounting base—in particular to a level mounting plate—from above in the Z-direction. The base leg 20 extends planarly in the X-/Y-plane.

The support rail 2 has a plurality (preferably at least two or more) of through holes or windows (hereafter also designated as through bores, without this term being intended to be understood limitingly in the sense of being introduced by boring). The through bores 4 are preferably configured in the base leg 20.

The through bores 4 can thereby be arranged in a defined pattern. A particularly preferred pattern includes an arrangement on an imaginary straight line with uniform spacings between two through bores 4 in each case. This pattern can optionally in each case have a spacing from a free end of the support rail 2 to the first through bore 4 which is different from this spacing. The two spacings from the respective free end to the first through bore 4 in each case are of equal size in this embodiment.

The through bores 4 have a defined profile or defined cross-sectional shape. The through bores 4a can have a circular cross-section. However, they can also be designed as a through bore 4b with an oval cross-section—that is, as an elongated hole—and/or as a through bore 4c with a keyhole-like cross-section. However, they can also have a polygonal cross-section.

In a following mounting step, mounting pins 5 are fixed in the base plate 3 (see FIG. 2*a*), for example screwed into the mounting base 3 in threaded bores provided for this purpose. The pattern of the threaded bores of the mounting base 3 correspond to the pattern in which the through bores 4*a*, 4*b* in the support rail 2 are arranged.

Figure 3B:
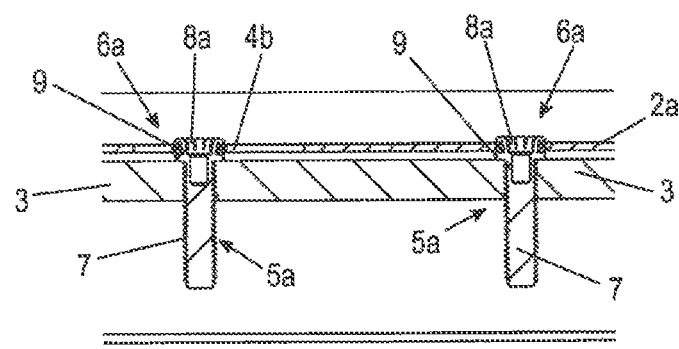
FIG. 3b is a sectional front view of the support rail from FIG. 2b.

The preferred mounting pin 5 has a head 6 (see FIG. 3*a*) and a shaft 7 (see FIG. 3*b*). The head 6 has a larger diameter compared to the shaft 7. The head 6 of the mounting pin 5 has at least one locking device 8. Alternatively, it can also have several of the locking devices 8. In this regard, the selected singular referring to the locking device 8 feature can also be replaced hereafter by a plural.

In the locked state, the locking device 8 cooperates with the through bore, which acts as a mating locking device relative to the locking device 8. In the locked state, the locking device 8 engages behind an edge of the through bore.

In a further mounting step, the support rail 2, which has been fitted with contact elements and functional elements 1 in the first mounting step, can be locked in place on the mounting pins 5.

In the further mounting step, the support rail 2 which has been fitted with contact elements and functional elements 1 in the first mounting step can, for example, be pushed onto the mounting base 3 perpendicularly over the respective mounting pins 5, so that the respective locking device 8 of the respective mounting pin 5 can be mounted, or locked, on the respective through bore 4*a*, 4*b* without a tool. The locking device 8 can be designed as an annular snap-fit connection.

FIG. 2*a* depicts a support rail 2*a* prior to mounting with the mounting pins 5*a*. The respective locking device 8*a* is arranged in each case at the head 6*a* of the respective mounting pin 5*a*. It is envisaged that the through bores 4*a*, 4*b* and the mounting pins 5*a* are configured in a manner corresponding to one another.

FIG. 3*a* depicts the support rail 2*a* from FIG. 2*a* in a sectional front view. It can be seen in FIG. 3*a* that the locking device 8*a* has segment-like recesses, which are distributed around the circumference, for example. As a result, it can be divided into several locking bars, which are arranged distributed around the circumference of the head of the mounting pin.

With suitable dimensioning and geometrical forming of the recesses, the spring characteristics of the locking device 8*a* can be optimally set such that the locking device 8*a* can be locked both simply and thus advantageously to the respective through bore 4*a*, and also durably maintains the locking connection to the respective through bore 4*a* under the stress of the weight of the contact elements and functional elements 1.

FIG. 2*b* depicts the support rail 2*a* from FIG. 2*a* during toolless mounting onto the mounting base 3. FIG. 3*b* depicts how the respective locking device 8*a* of the respective mounting pin 5*a* is thereby put in place at the respective through bore 4*a*, 4*b* and is thereby deformed elastically radially inwards, so that the support rail 2*a* can be pushed in the direction of the mounting base 3 until the locking device can expand elastically radially outwards again and deform.

FIG. 2*c* depicts the support rail 2*a* from FIG. 2*a* after toolless mounting on the mounting base 3.

Figure 3C:
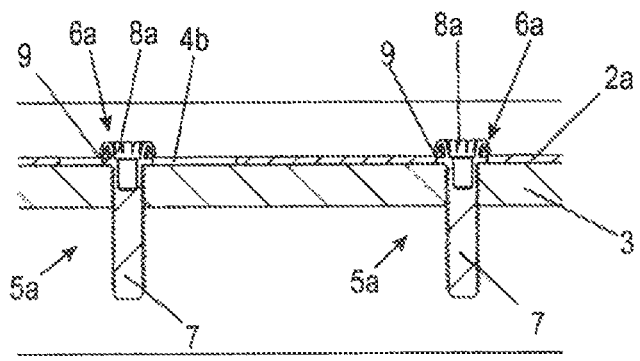
FIG. 3c is a sectional front view of the support rail from FIG. 2c.

FIG. 3*c* depicts how the head 6*a*, with the respective locking device 8*a* of the respective mounting pin 5*a*, can cover the respective through bore 4*a* like a mushroom cap or like a semi-circular rivet head in the locked state in which the locking device has expanded again. This is advantageous, since in this manner the support rail 2 durably lies firmly against the mounting base 3 and is securely attached thereto.

Figure 4A:
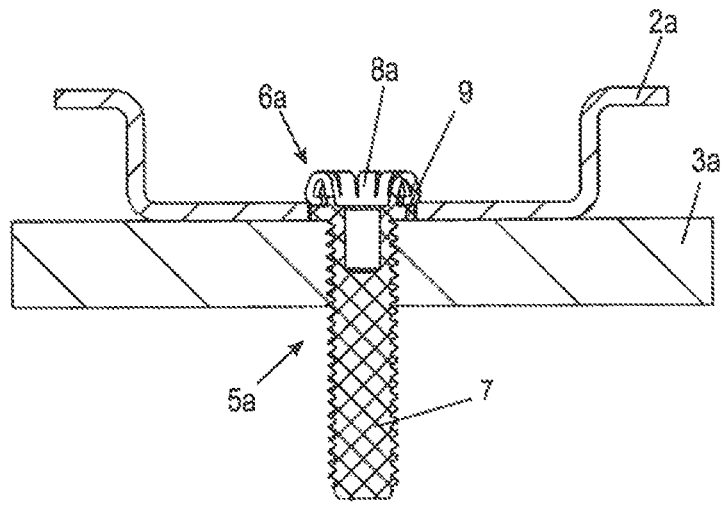
FIG. 4a is an enlarged sectional front view of the support rail from FIG. 2c.

FIG. 4*a* depicts an enlarged sectional front view of the support rail 2*a* from FIG. 2*c*. In this embodiment of the mounting base 3, the mounting base 3 has in the preferred—but not obligatory—design, a threaded bore corresponding to the respective through bore 4*a*, 4*b*. The respective mounting pin 5*a* engages, by its shaft 7 which is equipped with a corresponding male thread, through the threaded bore of the mounting base 3.

It can be seen in FIG. 4*a* that the resilient locking segments/locking bars/spring bars, which remain between recesses, of the locking device 8*a* can have a C-shaped cross-section, the respective free end of the respective locking segment, in the radial direction relative to the mounting pin 5*a*, being directed inwards, or in the direction of the mounting pin 5*a*. When the locking device 8*a* is in the locked state, the respective free end of the respective locking segment lies on the support rail 2*a* parallel to the plane of the mounting base 3.

Figure 4B:
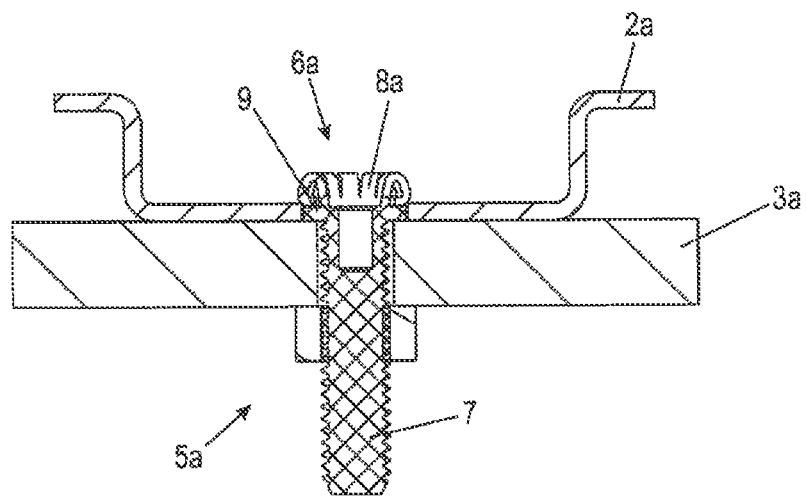
Figure 6A:
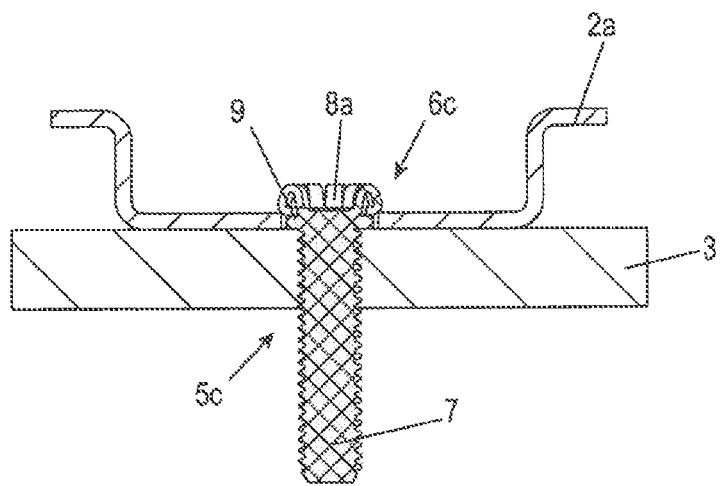
FIG. 6a is an enlarged sectional front view of the support rail from FIG. 3c, with a different embodiment of the mounting pin.
Figure 6B:
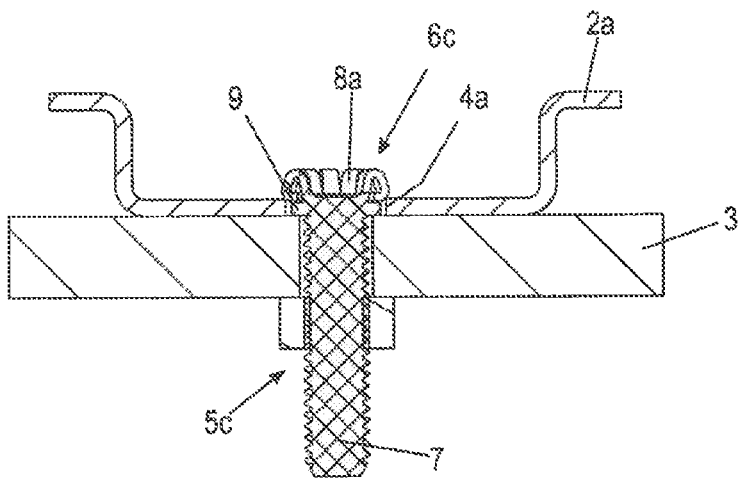

FIG. 4*b* depicts an alternative embodiment of the mounting base 3 wherein the mounting base has a through bore corresponding to the respective through bore 4*a*, 4*b*. The respective mounting pin 5*a* engages, by its shaft 7, through the through bore of the mounting base 3. The shaft 7, which is equipped with a corresponding male thread, engages through a threaded bore of a nut.

FIG. 4*a* and FIG. 4*b* depict how the head 6*a* of the mounting pin 6*a* (and also that of the mounting pin 6*b*, not shown) has a cylindrical collar 9. The collar extends axially between the shaft and the locking device. The collar 9 can axially and radially fill the through bore 4*a* completely, so that it can sit in the through bore of the support rail in a close-fitting manner. In particular, the height of the collar (in the Z direction) corresponds to the thickness of the support rail 2*a* (in the Z direction) in the region of the through bore 4*a*.

As a result, it is ensured that the locking device 8*a* cannot jam in the through bore 4*a* or 4*b*, such that the locking connection between the locking device 8*a* and the support rail 2*a*, or the attachment of the support rail 2*a*, by the mounting pin, and of the support rail 2 is durably secure.

FIG. 5*a* depicts the mounting pin 5*a*. The mounting pin 5*a* has, at its head 6*a*, the cylindrical collar 9. The locking device 8*a* is attached on the collar 9.

In turn, the locking device 8*a* has segment-like recesses.

The locking device 8*a* of this and all the embodiments can preferably be manufactured from a metallic material having good spring characteristics. The other sections of the mounting pins can also be manufactured from a metallic material. The attachment of the locking device 8*a* on the head 6*a* can be carried out by a stamping process or in another manner.

The head 6*a* of the mounting pin 5*a* can advantageously have a driving geometry—for example an internal polygon—for the transmission of torque onto the mounting pin 5*a*. Alternatively, the driving geometry for the transmission of torque can also be formed as an internal shape with multiple rounded parts, or in another manner. In FIG. 5*b*, it is possible to see the internal polygon of the mounting pin 5*a* and the recesses of the locking device 8*a* of the mounting pin 5*a*.

FIG. 5*c* depicts a further embodiment of the mounting pin 5*a*. In order to achieve optimal covering of the through bore 4*b* also in the case of a through bore 4*b* in the form of an elongated hole, so that the support rail 2*a* lies firmly on the mounting base 3 in a durable manner, the locking device 8*b* of the mounting pin 5b—in contrast to the locking device 8a—is designed without recesses.

A locking device 8 with recesses—such as the locking device 8a—can, in the case of a through bore 4b designed as an elongated hole, lead to incorrect or incomplete locking due to tilting or incomplete catching. This is precluded by the locking device 8b without recesses.

The locking device 8b therefore has an open annular geometry without segments. As a result, the respective locking device 8b of the respective mounting pin 5b lies against the respective through bore 4b and is thereby elastically deformed in the radial direction, such that the support rail 2a can be pushed in the direction of the mounting base 3.

After locking is complete, the head 6b with the respective locking device 8b of the respective mounting pin 5b covers the respective through bore 4b at least in sections like a mushroom cap or like a semi-circular rivet head, so that the support rail 2a lies firmly on the mounting base 3 in a durable manner.

The internal polygonal configuration of the mounting pin 5b from FIG. 5c can be seen in FIG. 5d.

FIGS. 6a, 6b, and 7a and 7b, depict a further embodiment of the mounting pin 5. In particular, differences and/or additions relative to the mounting pin 5a and 5b according to FIGS. 2a to 5d shall be described.

The head 6c of the mounting pin 5c—in contrast to the mounting pins 5a and 5b—has an external polygon as driving geometry for the transmission of torque onto the mounting pin 5c. The external polygon can be configured on a circumferential surface of the collar 9.

Figure 7A:
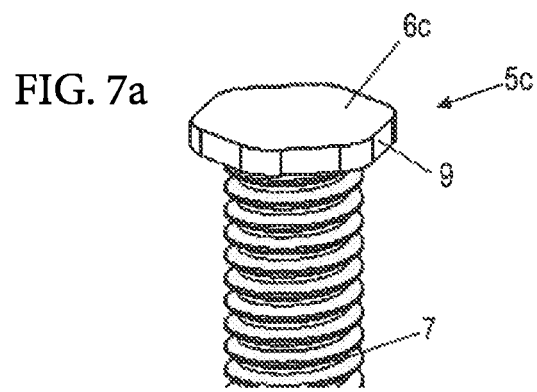
FIG. 7a is a perspective detail view of the mounting pin from FIG. 6a or FIG. 6b without the head details from FIG. 5a to FIG. 5d.
Figure 7B:
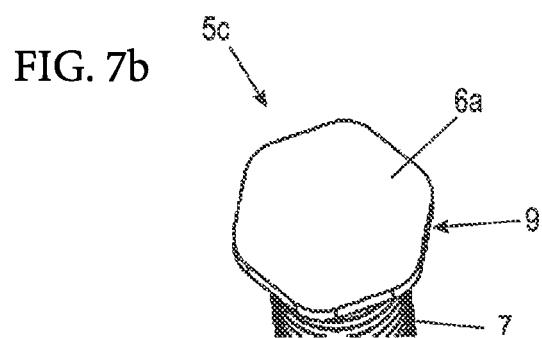

FIG. 7a and FIG. 7b depict the external polygon of the mounting pin 5c.

FIGS. 8a, 8b, and 9a and 9b, depict a further design variant of the mounting pin 5. Differences and/or additions relative to the mounting pin 5a and 5b according to FIGS. 2a to 5d shall be described.

Figure 8A:
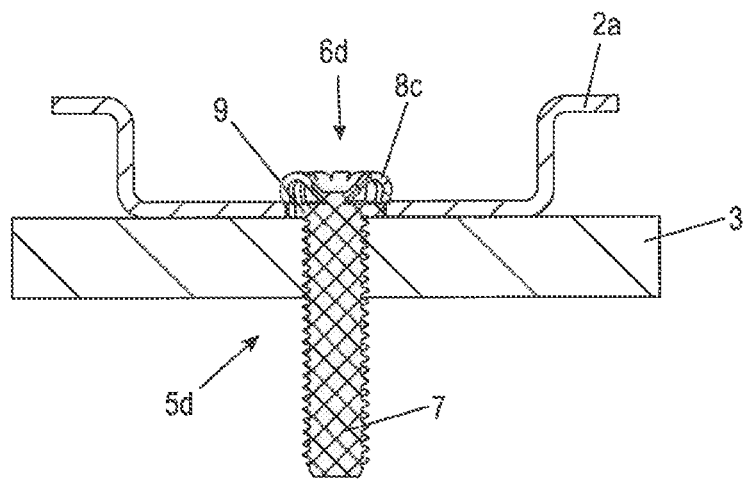
FIG. 8a is an enlarged sectional front view of the support rail from FIG. 3c, with a further embodiment of the mounting pin.
Figure 8B:
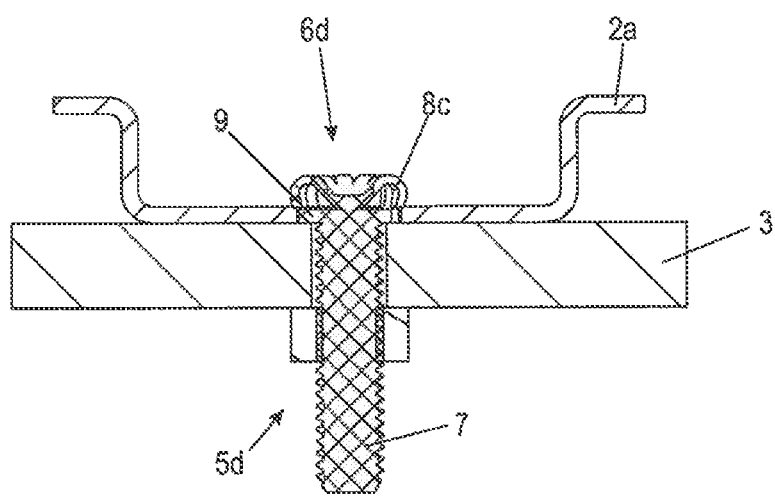

It can be seen in FIG. 8a that the resilient locking segments, which remain between the recesses, of the locking device 8c have a hooked or inverted cross-section, wherein the respective free end of the respective locking segment, in the axial direction relative to the mounting pin 5d, is directed downwards or in the direction of the support rail 2a. When the locking device 8c is in the locked state, the respective free end of the respective locking segment lies on the support rail 2a virtually perpendicular to the plane of the mounting base 3.

Here, the locking device 8c has segment-like recesses. The locking device 8c is preferably manufactured from a metallic material having good spring characteristics. The attachment of the locking device 8c on the head 6d is preferably carried out by a stamping process. The attachment can also be carried out in another manner. The head 6d of the mounting pin 5d has an external shape with many rounded parts as driving geometry for the transmission of torque onto the mounting pin 5d.

Figure 9A:
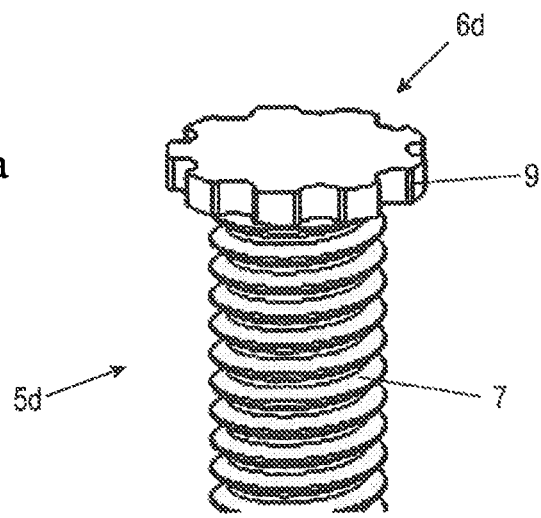
FIG. 9a is a perspective view of the mounting pin from FIG. 8a or FIG. 8b without the head details from FIG. 8a and FIG. 8b.
Figure 9B:
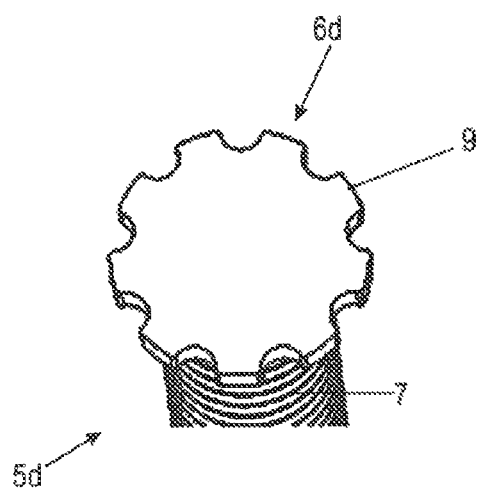
Figure 10A:
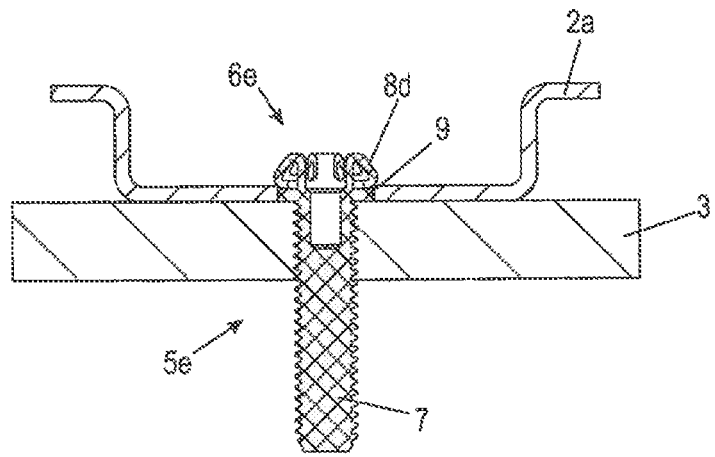
FIG. 10a is an enlarged sectional front view of the support rail from FIG. 3c, with a further embodiment of the mounting pin.
Figure 10B:
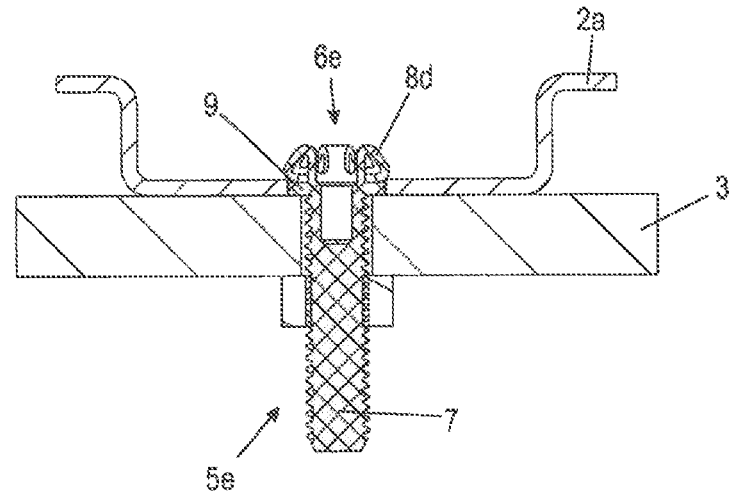

FIG. 9a and FIG. 9b depict the external shape, with many rounded parts, of the mounting pin 5d and the recesses of the locking device 8c of the mounting pin 5d.

FIGS. 10a, 10b, and 11a and 11d, depict a further embodiment of the mounting pin 5. Differences and/or additions relative to the mounting pin 5a and 5b according to FIGS. 2a to 5d shall be described.

The embodiment of the mounting pin 5 according to FIGS. 10a, 10b, and 11a and 11d, relates to the embodiment of the mounting pin 5b according to FIG. 5c and FIG. 5d.

In order to achieve optimal covering of the through bore 4b also in the case of a through bore 4b in the form of an elongated hole, so that the support rail 2a lies firmly on the mounting base 3 in a durable manner, the locking device 8d of the mounting pin 5e—in contrast to the locking device 8b—has an annular geometry and several recesses—four recesses in this case. This is depicted in FIGS. 11a, 11b, and 11c and 11d, respectively.

As a result, the respective locking device 8d of the respective mounting pin 5e lies against the respective through bore 4b and is thereby elastically deformed in the radial direction, such that the support rail 2a can be pushed in the direction of the mounting base 3.

The spring characteristics of the locking device 8d can be simply set by way of the recesses of the locking device 8d.

FIGS. 12a, 12b, and 13a and 13c, depict a further embodiment of the mounting pin 5. Differences and/or additions relative to the mounting pin 5a and 5b according to FIGS. 2a to 5d shall be described.

The embodiment of the mounting pin 5 according to FIGS. 12a, 12b and 13a to 13c is an embodiment of the mounting pin 5b (see FIG. 4b), such that the mounting pin 5f according to FIGS. 12a, 12b and 13a to 13c is preferably envisaged for through bores 4b with an oval cross-section or elongated-hole cross-section.

Figure 12A:
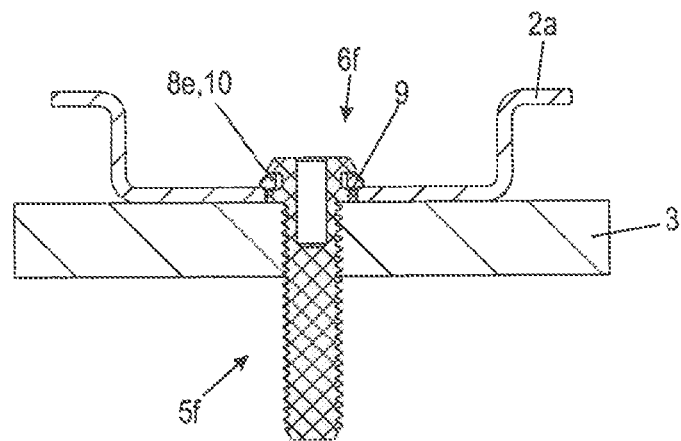
FIG. 12a is an enlarged sectional front view of the support rail from FIG. 3c, with a further embodiment of the mounting pin.
Figure 12B:
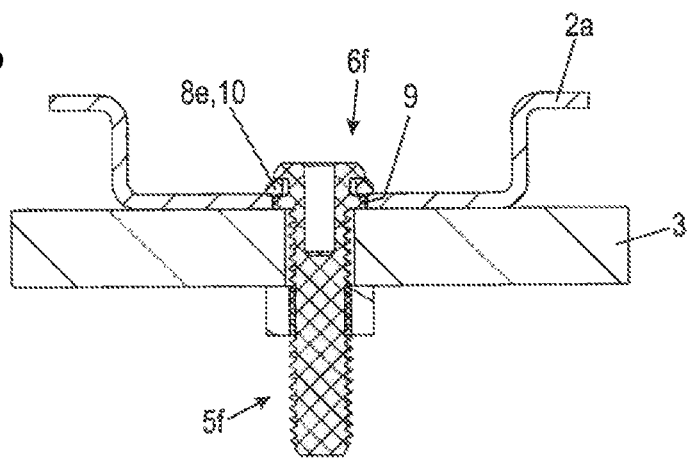

It can be seen in FIG. 12a that the head 6f of the mounting pin 5f has an annular groove 10. The annular groove 10 is arranged on the circumference of the head 6f. The annular groove 10 is arranged above the collar 9 relative to the length of the mounting pin 5f. The collar 9 has a cylindrical geometry.

FIG. 13a depicts the mounting pin 5f. Here, the locking device 8e is arranged in the annular groove 10 or rather fills the annular groove 10. The head 6f of the mounting pin 5f has an internal polygon as driving geometry for the transmission of torque onto the mounting pin 5f. Alternatively, the driving geometry for the transmission of torque can also be formed as an internal shape with multiple rounded parts.

FIG. 13b depicts the locking device 8e of the mounting pin 5f. The locking device 8e is formed to be solid and has a gap 11 in the radial direction. FIG. 13c depicts the internal polygon of the mounting pin 5f and the annular groove 10 of the mounting pin 5f.

In order to achieve optimal covering of the through bore 4b also in the case of a through bore 4b in the form of an elongated hole, so that the support rail 2a lies firmly on the mounting base 3 in a durable manner, the locking device 8e of the mounting pin 5f—in contrast to the locking device 8a, 8b—is designed virtually without recesses.

A locking device 8 with recesses—such as the locking device 8a—can, in the case of a through bore 4b designed as an elongated hole, lead to incorrect or incomplete locking due to tilting or incomplete catching. This is advantageously precluded by the locking device 8e without recesses.

The locking device 8e therefore has a continuous annular geometry, which is interrupted only by the gap 11. The gap 11 serves to set the spring characteristics of the locking device 8e. As a result, when the support rail is put in place, the respective locking device 8e of the respective mounting pin 5f lies against the respective through bore 4b and is thereby elastically deformed in the radial direction. As a result, the support rail 2a can be pushed in the direction of the mounting base 3 in a simple manner.

The head 6f with the respective locking device 8e of the respective mounting pin 5f covers the respective through bore 4b at least in sections like a mushroom cap or a semi-circular rivet head, so that the support rail 2 lies firmly on the mounting base 3 in a durable manner.

FIGS. 14a, 14b, and 15a, 15b and 15c, depict a further embodiment of the mounting pin 5. Differences and/or additions relative to the mounting pin 5a and 5b according to FIGS. 2a to 5d shall be described.

The embodiment of the mounting pin 5 according to FIGS. 14a, 14b and 15a to 15c is an embodiment of the mounting pin 5b (see FIG. 4b), such that the mounting pin 5g according to FIGS. 14a, 14b and 15a to 15c is preferably envisaged for through bores 4b having an oval cross-section or elongated hole-cross-section.

Figure 14A:
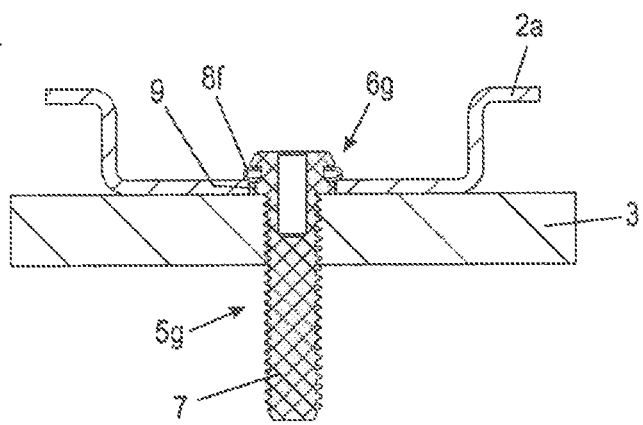
FIG. 14a is an enlarged sectional front view of the support rail from FIG. 3c, with a further embodiment of the mounting pin.
Figure 14B:
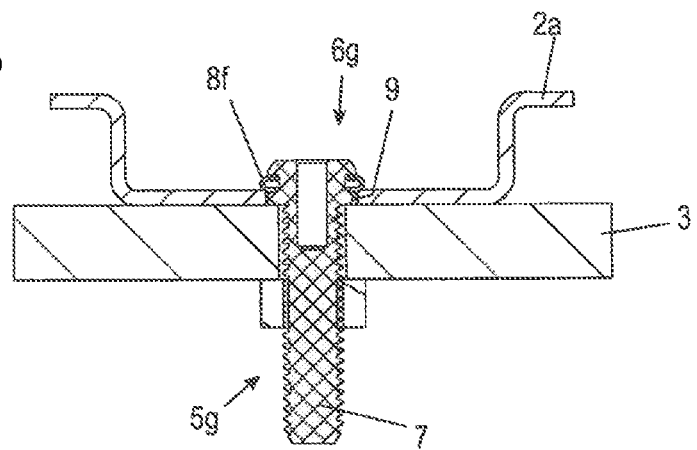

It can be seen in FIG. 14a that the head 6g of the mounting pin 5g has an annular groove 10. The annular groove 10 is arranged on the circumference of the head 6g. The annular groove 10 is arranged above the collar 9 relative to the length of the mounting pin 5g. The collar 9 has a cylindrical geometry.

Figure 15C:
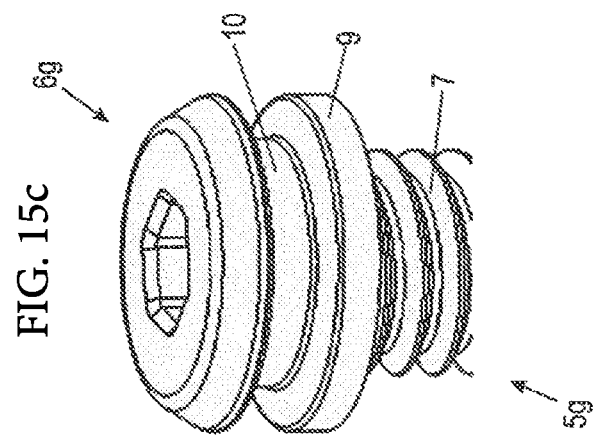
FIG. 15c is a perspective detail view of the mounting pin from FIG. 15a without the locking device from FIG. 15b.
Figure 15B:
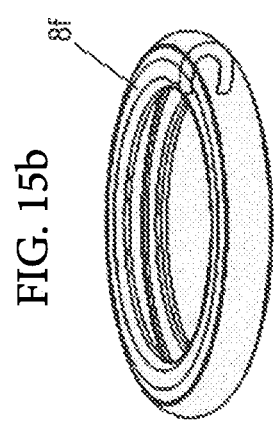
Figure 15A:
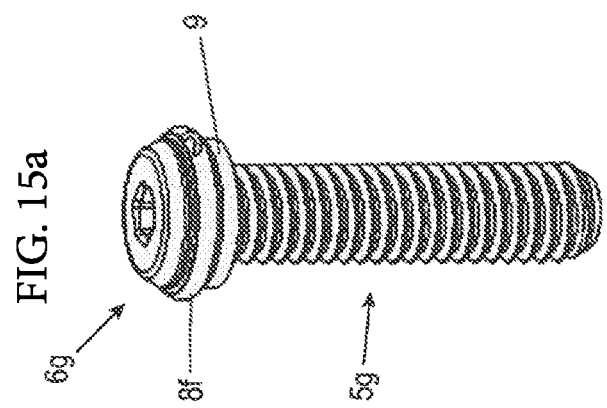
FIG. 15a is a perspective view of a mounting pin from FIG. 14a or FIG. 14b.

FIG. 15a depicts the mounting pin 5g. Here, the locking device 8f is arranged in the annular groove 10 or rather fills the annular groove 10. The head 6g of the mounting pin 5g has a driving geometry for the transmission of torque onto the mounting pin 5g. This is designed as an internal polygon. Alternatively, the driving geometry for the transmission of torque can also be formed in another manner, such as an internal shape with multiple rounded parts.

FIG. 15b depicts the locking device 8f of the mounting pin 5. The locking device 8f is formed to be hollow (see FIG. 14a and FIG. 14b) and is formed in the form of a "C" which is open radially inwards.

FIG. 15c depicts the internal polygon of the mounting pin 5g and the annular groove 10 of the mounting pin 5g.

In order to achieve optimal covering of the through bore 4b also in the case of a through bore 4b in the form of an elongated hole, so that the support rail 2a lies firmly on the mounting base 3 in a durable manner, the locking device 8f of the mounting pin 5g is designed—in contrast to the locking device 8a, 8b—without recesses.

A locking device 8 with recesses—such as the locking device 8a—can, in the case of a through bore 4b designed as an elongated hole, lead to incorrect or incomplete locking due to tilting or incomplete catching. This is precluded by the locking device 8f without recesses.

The locking device 8f is therefore formed in a ring-shaped manner and has a C-shaped cross-sectional geometry, with the "C" being opened radially inwards. As a result, when the support rail is put in place, the respective locking device 8f of the respective mounting pin 5g lies against the respective through bore 4b and, when the support rail lowers further, is elastically deformed in the radial direction perpendicular to the mounting base—in the Z-direction. As a result, the support rail 2a can be pushed in the direction of the mounting base 3. The spring characteristic of the locking device 8f is thereby settable via the size of the gap 11.

The head 6g with the respective locking device 8f of the respective mounting pin 5g covers the respective through bore 4b at least in sections like a mushroom cap or like a semi-circular rivet head, so that the support rail 2a lies firmly on the mounting base 3 in a durable manner.

FIGS. 16a, 16b, 16c, 16d and 17a, 17b, 17c, 17d, and 18a, 18b and 18d, depict a further design variant of the mounting pin 5.

It is also envisaged here that, in a first mounting step all of the housings 1 comprising contact elements and functional elements are strung together in a defined quantity and sequence on the support rail 2.

The support rail 2b according to FIG. 16a, 16b, 16c, 16d has through bores 4. The through bores 4, which are envisaged for the mounting pins 5, are designed as through bores 4c having a keyhole-like cross-section.

The through bore 4c having the keyhole-like cross-section thus has a first region with a first diameter 12a and a second region with a second diameter 12b. The first diameter 12a is smaller than the second diameter 12b of the through bore 4c.

The dimensions of the first diameter 12a and of the second diameter 12b of the through bore 4c are selected such that the first, smaller diameter 12a is larger than the diameter of the shaft 7 of the mounting pin 5h and the second, larger diameter 12b is larger than the diameter of the head 6h of the mounting pin 5h. In this regard, the through bore 4c and the mounting pin 5h function as a type of bayonet lock.

Furthermore, resilient pressure pieces 13 are screwed into the mounting base 3. The respective resilient pressure piece 13 has a resilient stud 14. The respective resilient pressure piece 13 is screwed into the mounting base 3 such that the respective resilient stud 14, in the unstressed state, protrudes fully from the mounting base 3, so that the resilient studs 14 which protrude out of the mounting base 3 in the unstressed state serve as a type of stop for the support rail 2b which is to be mounted.

In a following mounting step, the mounting pins 5h and the resilient pressure pieces 13 are screwed into the threaded bores in the mounting base 3 which in each case are envisaged for this purpose. The threaded bores, which are envisaged for the mounting pins 5h and for the resilient pressure pieces 13, respectively correspond to the through bores 4c in the support rail 2b (see e.g. FIG. 16c, 16d). The mounting pin 5h has a head 6h (see e.g. FIG. 16b) and a shaft 7.

In a further mounting step, the support rail 2b which has been prepared with contact elements and functional elements 1 in the first mounting step is pushed onto the mounting base 3 perpendicularly via the respective mounting pin 5h, so that the head 6h of the mounting pin 5h engages through the large diameter 12b of the respective through bore 4c. In this case, the stud 14 of the resilient pressure piece 13 in each case is fully spring-deflected or compressed (see FIG. 17a, 17b in this regard).

Figure 18A:
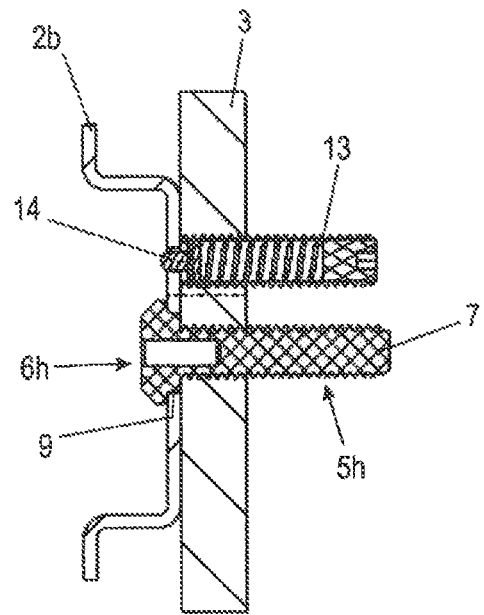
FIG. 18a is a perspective view of the embodiment of the support rail from FIG. 16a, the support rail being depicted after toolless mounting has occurred.
Figure 18B:
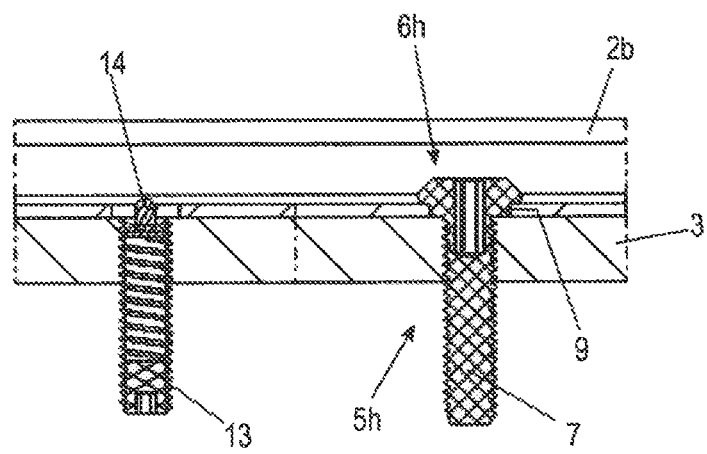
Figure 18C:
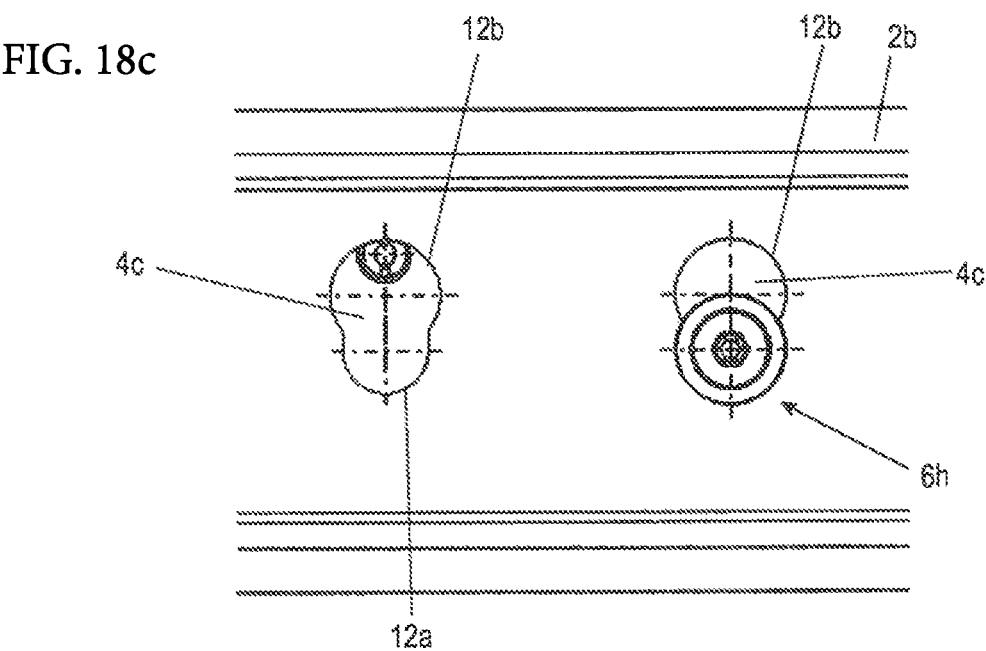
FIG. 18c is a plan view of FIG. 18b.
Figure 18D:
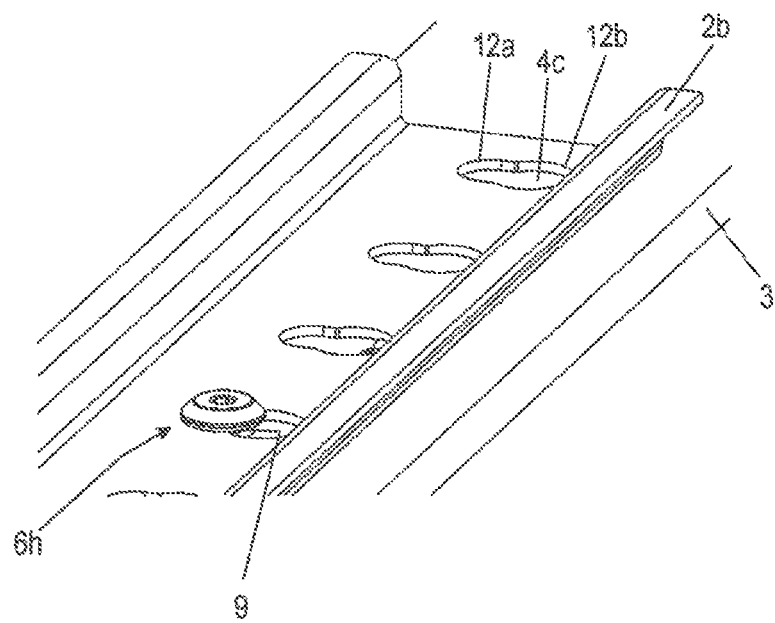
FIG. 18d is a perspective view of FIG. 18c.
Figure 19A:
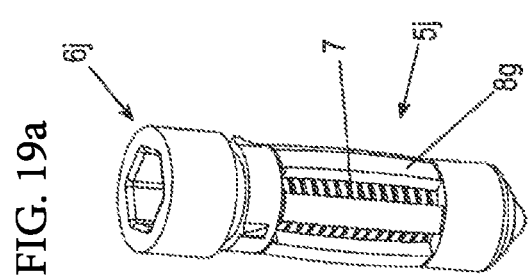
FIG. 19a is a perspective view of a further embodiment of a mounting pin according to the invention.
Figure 19B:
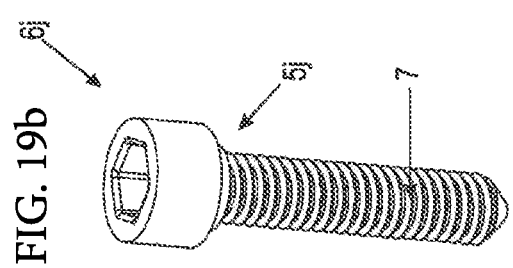
Figure 19C:
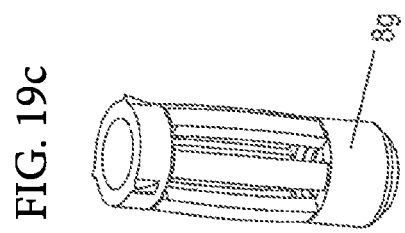

In a final mounting step, the support rail 2b is pushed such that in each case the shaft 7 of the mounting pin 5h engages through the smaller diameter of the through bore 4c, so that the head 6h of the mounting pin 5h overlaps the small diameter 12a of the through bore 4c in the manner of a mushroom cap. Through the movement of the support rail 2b, the respective stud 14 of the respective resilient pressure piece 13 rebounds again. In this case, the respective stud 14 lies tangentially against an inner side of the through bore 4c in the region of the larger diameter 12b as shown in FIGS. 18c, 18d.

FIG. 16a, 16b, 16c, 16d depict a support rail 2b prior to mounting with the mounting pins 5h. It is depicted that the through bores 4c correspond with the mounting pins 5h.

Figure 17A:
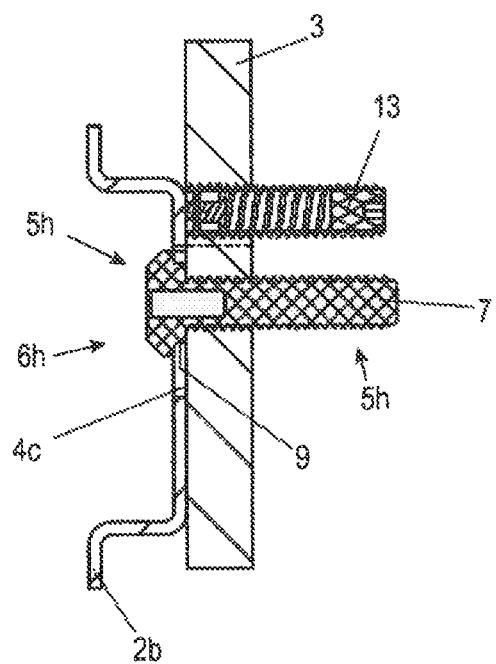
FIG. 17a is a front view of the embodiment of the support rail from FIG. 16a, the support rail being depicted during toolless mounting.
Figure 17B:
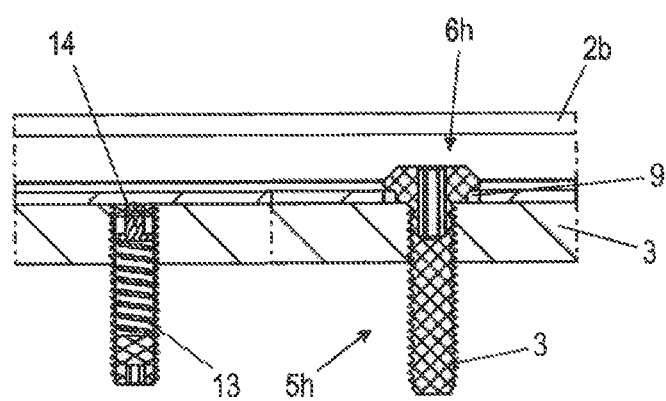
Figure 17C:
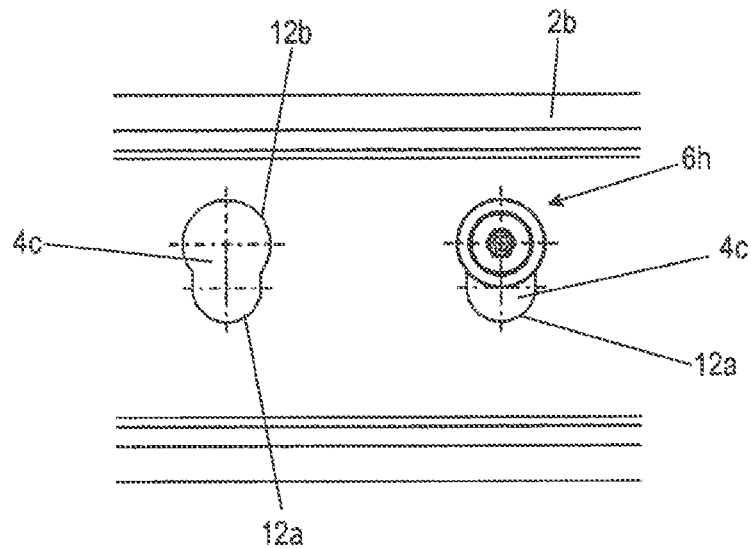
FIG. 17c is a plan view of FIG. 17b.
Figure 17D:
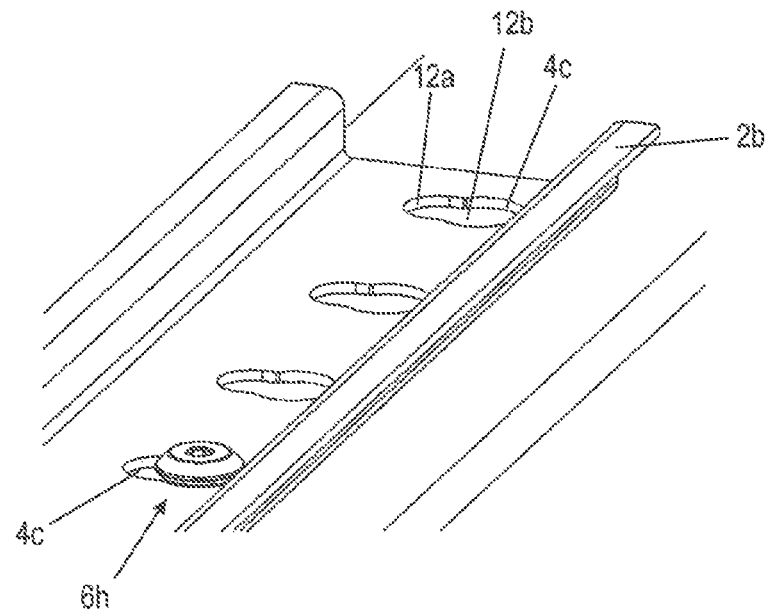
FIG. 17d is a perspective view of FIG. 17c.

FIGS. 17a, 17b, 17c, 17d depict the support rail 2b during toolless mounting onto the mounting base 3. FIGS. 17a and 17b depict how the head 6h of the mounting pin 5h engages through the respective through bore 4c at its larger diameter 12b and the stud 14 of the respective resilient pressure pieces 13 is fully spring-deflected. The support rail 2b thus lies flatly against the mounting base 3.

FIGS. 18a, 18b, 18c, 18d depict the support rail 2b after the toolless mounting onto the mounting base 3. FIGS. 18a, 18b, 18c, 18d depict how the respective head 6h of the respective mounting pin 5h covers the smaller diameter 12a of the respective through bore 4c in the manner of a mushroom cap or a semi-circular rivet head, so that the support rail 2b lies firmly on the mounting base 3 in a durable manner.

Figure 16A:
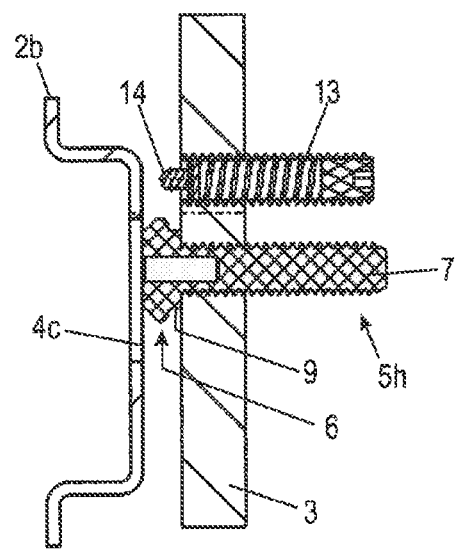
FIG. 16a is a perspective view of a further embodiment of a support rail, the support rail being depicted prior to toolless mounting.
Figure 16B:
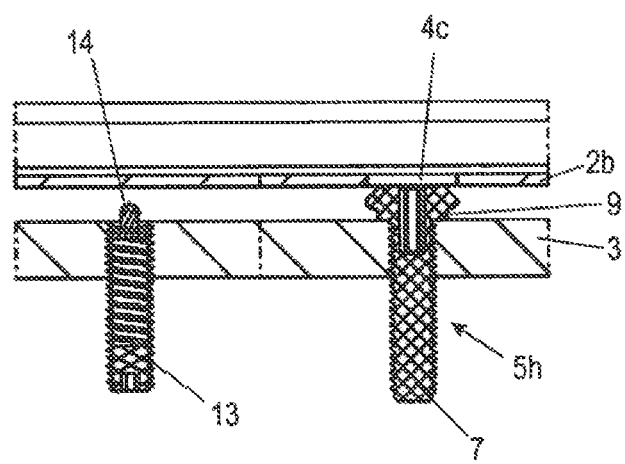
FIG. 16b is a sectional front view of the support rail from FIG. 16a with a further embodiment of a mounting pin and a supplementary element.
Figure 16C:
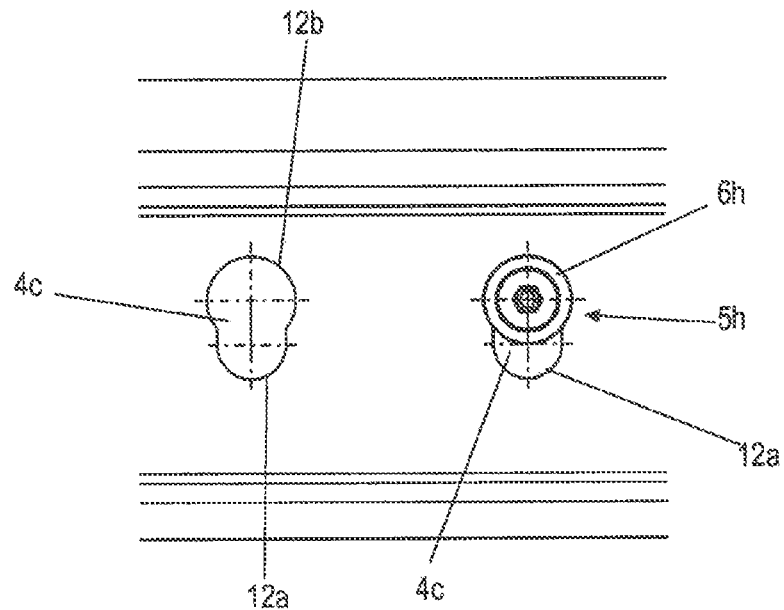
FIG. 16c is a plan view of FIG. 16b.
Figure 16D:
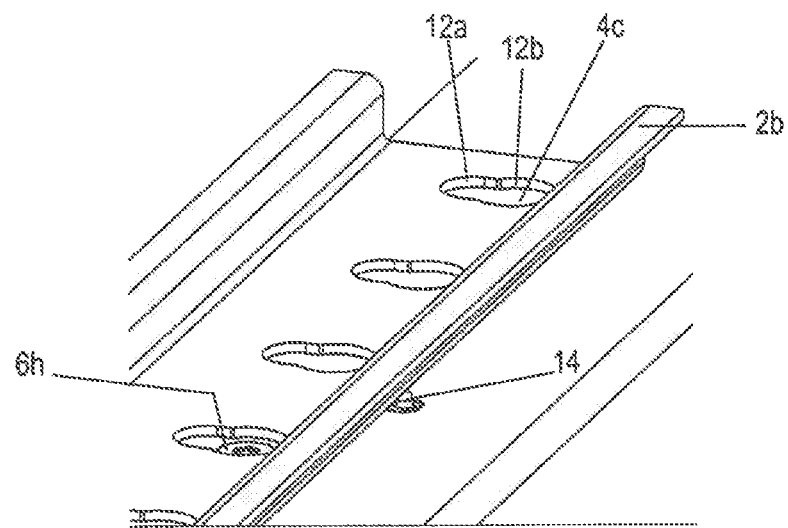
FIG. 16d is a perspective view of FIG. 16c.

It is depicted in FIG. 16a, b, 17a, b, 18a, b that the head 6h of the mounting pin 5h has a cylindrical collar 9. The collar 9 is formed such that it fills the smaller diameter 12a of the through bore 4c axially and radially entirely or in any case substantially (e.g. up to recesses of a torque-transmission profile), such that the height of the collar corresponds to the thickness of the support rail 2b in the region of the through bore 4c.

In the vertical direction, the closure of the head 6h, which is formed like a mushroom cap or a semi-circular rivet head, is attached above the collar 9.

As a result, the attachment of the support rail 2b that is achieved by the mounting pin 5h and of the support rail 2b is durably secure. The head 6h of the mounting pin 5h has an internal polygon as driving geometry for the transmission of torque onto the mounting pin 5h. Alternatively, the driving geometry for the takeover of torque can also be formed as an internal shape with multiple rounded parts.

In contrast to the embodiments of the mounting pin 5 which are described further above, the locking device 8 is designed as a resilient pressure piece 13 or rather as a resilient stud 14—in other words, as a separate component. The resilient pressure piece 13, with its resilient stud 14, ensures that the shaft 7 of the mounting pin 5h durably securely engages through the smaller diameter 12a of the through bore 4c, so that the mounting pin 5h head 6h which is formed like a mushroom cap or a semi-circular rivet head lies durably securely on the support rail 2b in the region of the smaller diameter 12a of the through bore, so the durable attachment of the support rail 2b to the mounting base 3 is guaranteed as shown in FIGS. 18a, 18b, 18c, 18d.

FIGS. 19a, 19b, 19c and 20a, 20b, 20c and 21a, 21b, 21c depict a further embodiment of the mounting pin 5.

It is also envisaged that, in a first mounting step, all of the housings 1 including contact elements and functional elements are strung together in a defined quantity and sequence on the support rail 2.

The support rail 2a according to FIGS. 20a, 20b, 20c and FIG. 21a, 21b, 21c has through bores 4. The through bores 4, which are envisaged for the mounting pins 5, are designed as through bores 4a having a cylindrical cross-section.

In a following mounting step, the mounting pins 5j are inserted through the through bores 4a of the support rail 2a. This preferably takes place at those locations at which a spacer which is already pre-mounted (shown crosshatched in FIG. 20c).

Figure 20A:
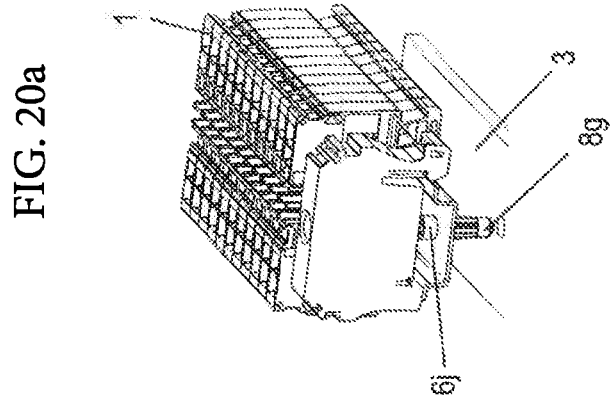
Figure 20B:
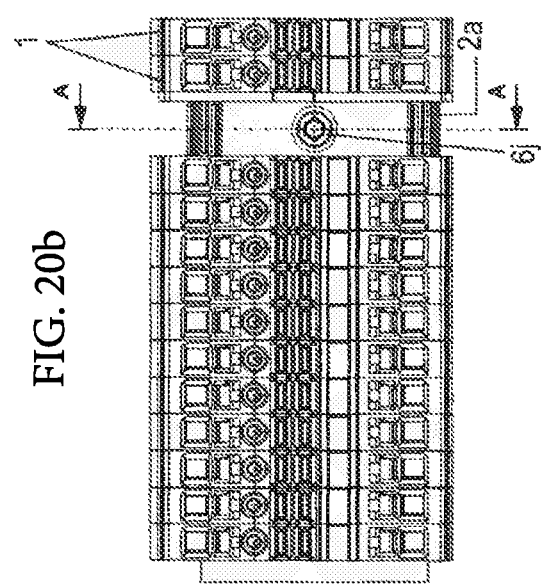
Figure 20C:
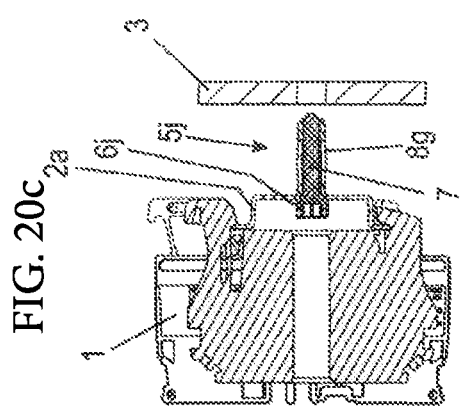

In a mounting step which occurs subsequent thereto, one dowel-like locking device 8g envisaged for this purpose in each case is placed onto the shaft 7 of the respective mounting pin 5j as shown in FIG. 20a and FIG. 20c. The mounting pin 5j has a head 6j (FIGS. 19a, 19b) as well as a shaft 7.

Figure 21A:
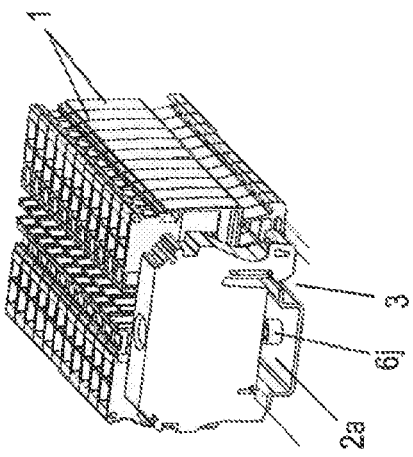
Figure 21B:
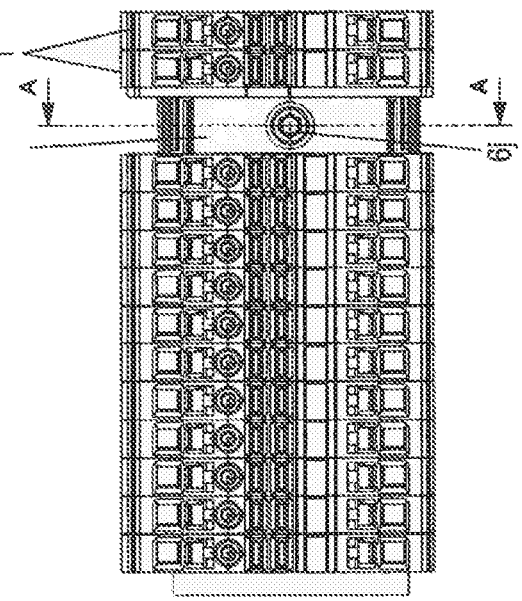
Figure 21C:
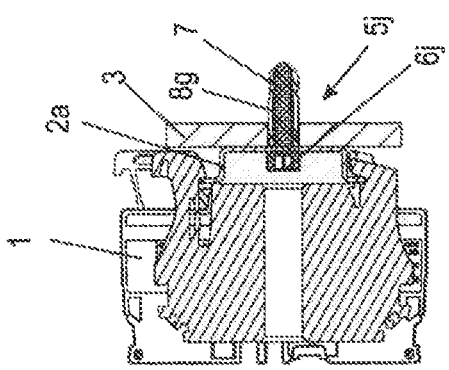
Figure 22A:
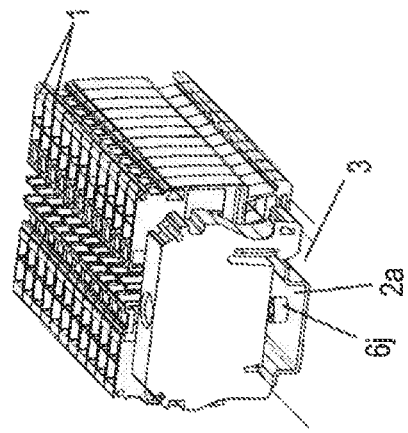
FIG. 22a is a perspective view of strung-together electrical contact elements and functional elements on the support rail from FIG. 20a after mounting with the mounting pin from FIG. 19a has been carried out.
Figure 22B:
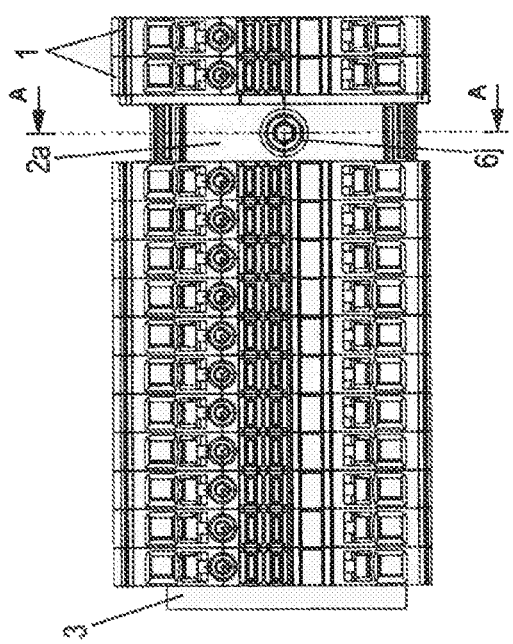
FIG. 22b is a plan view of strung-together electrical contact elements and functional elements on the support rail from FIG. 20a after mounting with the mounting pin from FIG. 19a has been carried out.
Figure 22C:
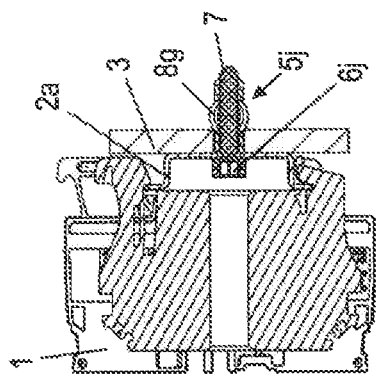
FIG. 22c is a sectional side view of strung-together electrical contact elements and functional elements on the support rail from FIG. 20a after mounting with the mounting pin from FIG. 19a has been carried out.

In a further mounting step, the support rail 2a, which is prepared in the first mounting step with the housings for contact elements and functional elements 1 and with the mounting pin 5j inserted through the respective through bore 4a in the subsequent mounting step, and in the subsequent mounting steps the locking device 8g placed onto the shaft 7 of the mounting pin 5j, is pushed perpendicularly via a respective through bore of the mounting base 3, so that the shaft 7 engages with the locking device 8g of the mounting pin 5j through the respective through bore of the mounting base 3 (see FIG. 21c).

The locking device 8 is designed as a dowel-like locking device 8g, the locking function of which—as in the case of a dowel—is activated by screwing-in the mounting pin 5j. The locking device 8g accordingly functions according to the principle of an annular snap-fit connection. An elastic deformation of the locking device 8g is guaranteed by recesses arranged on the circumference of the locking device 8g. There, continuous bars emerge between the recesses at the circumference of the locking device 8g. Because of the recesses, the spring characteristics of the locking device 8g can be advantageously predefined.

The mounting pin 5j has a head 6j (FIGS. 19a, 19b), as well as a shaft 7. The head 6j of the mounting pin 5j has an internal polygon as driving geometry for the transmission of torque onto the mounting pin 5j. Alternatively, the driving geometry for the torque can also be formed as an internal shape with multiple rounded parts.

The shaft 7 has an outer thread. The diameter of the outer thread and the inner diameter of the locking device 8g correspond to one another such that the locking device 8d can be screwed onto the outer thread. Through further screwing of the mounting pin 5j into the locking device 8g, there arises an elastic deformation of the locking device 8g through radial spreading of the bars between the recesses of the locking device 8g. Radial spreading of the bars occurs through the shortening of the effective length of the locking device 8g due to the further screwing of the mounting pin 5j into the locking device 8g.

In a final mounting step, the mounting pin 5j is screwed in via the internal polygon in the dowel-like locking device 8g, so that the locking device 8g deploys its locking function (see FIG. 21c) and the mounting pin is fixed and retained by the locking device 8g in the through bore of the mounting base 3.

As a result, it is ensured that the attachment of the support rail 2a by the mounting pin 5j is durably secure.

The mounting pin(s) 5a, 5b, 5c, 5d, 5e, 5f, 5g, 5h, 5j according to a preferred embodiment, are able to safely dissipate the PE current of the support rail 2a, 2b or to influence the connection of the support rail 2a, 2b to the mounting base (3) such that this is possible. For this purpose, the mounting pin(s) 5a, 5b, 5c, 5d, 5e, 5f, 5g, 5h, 5j are designed to dissipate the PE current of the support rail 2a, 2b, for example by being produced from a metal which conducts well or by being coated with it and being conductively connected and arranged. They can also be designed in such a way to influence the connection of the support rail 2a, 2b to the mounting base 3, e.g. like a switch, in such a manner that this is possible.

The invention claimed is:
1. An assembly, comprising
a mounting base;
at least two mounting pins threadably connected with said mounting base, each mounting pin including a locking device comprising a dowel for locking each mounting pin on said mounting base, wherein each dowel engages a shaft of said mounting pin and axially shortens and radially widens when said mounting pin is threadably connected with said mounting base; and
a support rail on which a plurality of housings equipped with electrical contact and/or functional elements can be arranged mounted on said mounting base, said mounting pins and said support rail being configured to lock said support rail on said mounting base, whereby said support rail may be mounted on said mounting base without using a tool.

2. The assembly as defined in claim 1, wherein each mounting pin is designed to dissipate a PE current of said support rail.

3. The assembly as defined in claim 1, wherein said support rail contains through bores arranged in a defined pattern.

4. The assembly as defined in claim 3, wherein said through bores have at least one of a polygonal, circular, oval, elongated, and keyhole cross-section.

5. The assembly as defined in claim 4, wherein each through bore has a portion having a first diameter and a second portion having a second diameter greater than said first diameter.

6. The assembly as defined in claim 5, wherein each mounting pin includes a head and a shaft having a smaller diameter than said head.

7. The assembly as defined in claim 6, wherein said first diameter of each through bore first portion is larger than a diameter of said mounting pin shaft and said second diameter of each through bore second portion is larger than a diameter of said mounting pin head.

8. The assembly as defined in claim 6, wherein each mounting pin head includes at least one locking device.

9. An assembly, comprising
a mounting base;
at least two mounting pins connected with said mounting base, each said mounting pin including a head having at least one locking device and a shaft, wherein said locking device contains a plurality of spaced recesses to define a plurality of locking bars; and
a support rail on which a plurality of housings equipped with electrical contact and/or functional elements can be arranged mounted on said mounting base, said support rail contains through bores having at least one of a polygonal, circular, oval, elongated, and keyhole cross-section arranged in a defined pattern, said mounting pins and said support rail being configured to lock said support rail on said mounting base, whereby said support rail may be mounted on said mounting base without using a tool.

10. The assembly as defined in claim 9, wherein said locking device of each head cooperates with a respective one of said through bores in a locked state to define an annular snap-fit connection.

11. The assembly as defined in claim 9, wherein locking device has a C-shaped or an L-shaped cross-section.

12. The assembly as defined in claim 9, wherein a free end of each locking bar is directed radially inwardly direction relative to each mounting pin.

13. The assembly as defined in claim 9, wherein each locking device is solid and contains a radial gap.

14. The assembly as defined in claim 9, wherein each locking device is hollow and has a C-shaped configuration which opens radially inwardly.

15. The assembly as defined in claim 9, wherein each locking device lock with a respective through bore.

16. The assembly as defined in claim 9, wherein each locking means is formed of a metallic material having a spring-like character.

17. The assembly as defined in claim 9, wherein each locking device includes a resilient pressure member.

18. The assembly as defined in claim 9, wherein said mounting pin head contains an annular groove.

19. The assembly as defined in claim 18, wherein said locking device is arranged in said annular groove.

20. An assembly, comprising
a mounting base;
at least two mounting pins connected with said mounting base, each said mounting pin including a head having at least one locking device and a shaft having a smaller diameter than said head, said locking device including a resilient pressure member being screwed into the mounting base, a resilient stud portion of the resilient pressure member protruding from said mounting base in an unstressed state to define a stop for said support rail when said support rail is mounted on said mounting base; and
a support rail on which a plurality of housings equipped with electrical contact and/or functional elements can be arranged mounted on said mounting base, said support rail contains through bores having at least one of a polygonal, circular, oval, elongated, and keyhole cross-section arranged in a defined pattern, said mounting pins and said support rail being configured to lock said support rail on said mounting base, whereby said support rail may be mounted on said mounting base without using a tool.

21. The assembly as defined in claim 20, wherein a head of each mounting pin covers respective through bore like a mushroom cap or semi-circular rivet head when said support rail is mounted on said mounting base.

22. The assembly as defined in claim 20, wherein said mounting base contains a threaded bore corresponding to each respective through bore.

23. The assembly as defined in claim 22, wherein each mounting pin shaft is threaded for connection with said mounting base threaded bore.

24. The assembly as defined in claim 20, wherein each mounting pin shaft is threaded and passes through a through bore of the mounting base, and further comprising a nut connected with said mounting pin shaft to connect said mounting pin with said mounting base.

25. The assembly as defined in claim 20, wherein each mounting pin head includes a collar.

26. The assembly as defined in claim 25, wherein each locking device is arranged on said collar.

27. The assembly as defined in claim 25, wherein said collar fills a respective through bore, a height of said collar corresponding to a thickness of said support rail in a region of said respective through bore.

28. An assembly, comprising
a mounting base;
at least two mounting pins connected with said mounting base, each said mounting pin including a head having a collar and a shaft having a smaller diameter than said head, wherein one of said mounting pin head and collar has a driving configuration for the transmission of torque to said mounting pin; and
a support rail on which a plurality of housings equipped with electrical contact and/or functional elements can be arranged mounted on said mounting base, said support rail contains through bores having at least one of a polygonal, circular, oval, elongated, and keyhole cross-section arranged in a defined pattern, said mounting pins and said support rail being configured to lock said support rail on said mounting base, whereby said support rail may be mounted on said mounting base without using a tool.

29. The assembly as defined in claim 28, wherein said driving configuration comprises at least one of an internal polygon, an external polygon, an internal configuration with multiple rounded portions or an external configuration with multiple rounded portions.

* * * * *